No. 798,217. PATENTED AUG. 29, 1905.
C. SCHÖPPNER.
VARIABLE SPEED GEAR.
APPLICATION FILED JAN. 9, 1905.
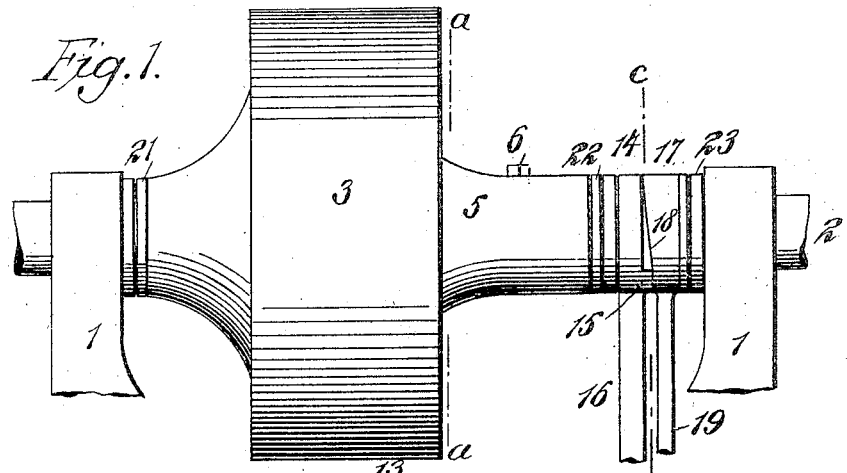
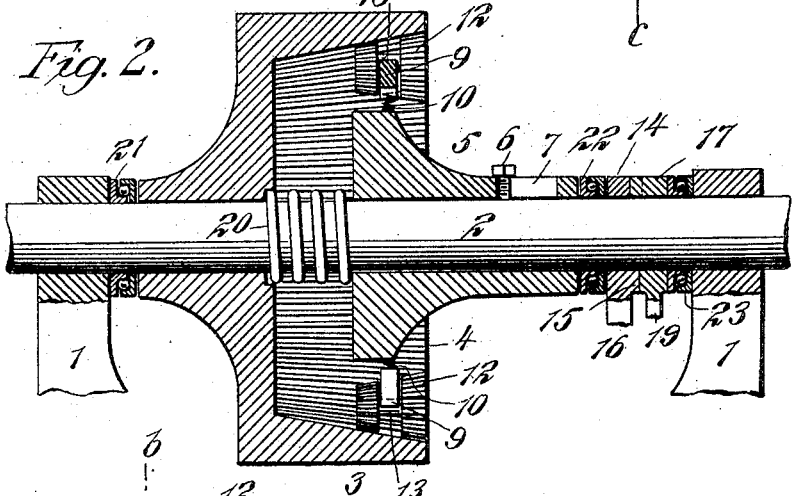
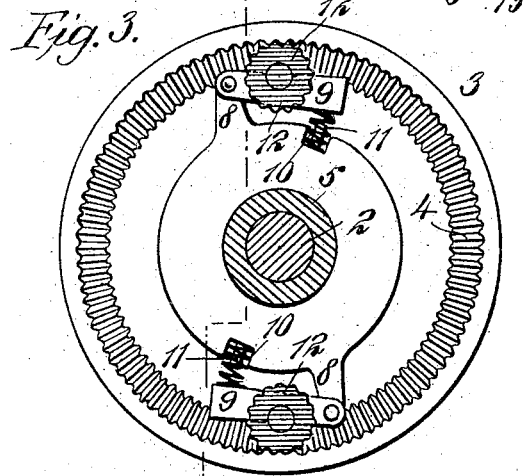
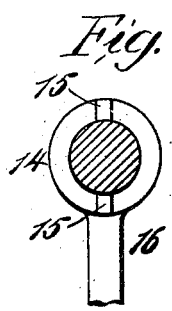
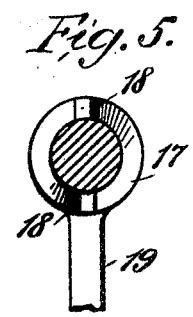
Witnesses
J. F. Curtiss
Dorothy Stackeroth
Christopher Schöppner, Inventor
By his Attorney A. M. Pierce

UNITED STATES PATENT OFFICE.

CHRISTOPHER SCHÖPPNER, OF NEW YORK, N. Y.

VARIABLE-SPEED GEAR.

No. 798,217.　　　　Specification of Letters Patent.　　　　Patented Aug. 29, 1905.

Application filed January 9, 1905. Serial No. 240,141.

*To all whom it may concern:*

Be it known that I, CHRISTOPHER SCHÖPPNER, a citizen of the United States, residing at New York, in the county of New York and State of New York, have invented a certain new and useful Improvement in Variable-Speed Gear, of which the following is a specification, reference being had therein to the accompanying drawings.

My invention relates especially to the construction and arrangement of that class of gears wherein the speed may be varied or changed at will, and has for its object the provision of a variable-speed gear wherein means are provided for gradually changing the speed of the driven part from zero to the speed of the driving part or the reverse.

To attain the desired end, my invention consists, essentially, in a variable-speed gear in which is comprised a driving part provided with an internal gear in combination with a driven part provided with a plurality of gears the teeth whereof mesh with the internal gear, the shafts of said gears being mounted in friction-bearings, and means for varying the friction of said bearings; and my invention also involves certain novel and useful combinations or arrangements of parts and peculiarities of construction and operation, all of which will be hereinafter first fully described and then pointed out in the claims.

In the accompanying drawings, forming a part hereof, Figure 1 is a side elevation of a device embodying my invention. Fig. 2 is a longitudinal sectional view thereof at line *b b* of Fig. 3. Fig. 3 is a vertical cross-sectional view at line *a a* of Fig. 1 looking from the right. Fig. 4 is a like view at line *c c* of Fig. 1 looking from the right, and Fig. 5 is a corresponding view looking from the left on line *c c*.

Similar numerals of reference wherever they occur indicate like parts in all the figures.

1 1 are bearings wherein is mounted a shaft 2, to be driven.

3 is a wheel or pulley constituting the driving part, loosely mounted on the shaft 2 and provided with an internal gear 4.

5 is a hub mounted upon the shaft 2 held against rotation thereon, as by a screw 6, said screw projecting from the shaft through a slot 7, thus permitting a slight longitudinal movement of the hub upon the shaft. Projecting from the hub 5 are arms 8, whereto are pivoted bearing-blocks 9.

10 represents springs which normally throw the free ends of the blocks 9 outward, and 11 represents stops for limiting the inward movement of said blocks. 12 represents gears, the shafts 13 whereof are seated in the bearing-blocks 9.

14 is a collar provided with projections 15 on one of its faces and a handpiece 16. This collar is loosely mounted on the shaft 2. 17 is a second collar having inclines 18 upon one of its faces and a handpiece 19.

20 is a spring which normally holds the hub 5 in the position indicated in Fig. 2 of the drawings.

21, 22, and 23 are ball friction-collars.

When constructed and arranged in accordance with the foregoing description, the operation of my device is as follows: Power being applied to the wheel or pulley 3, it revolves upon the shaft 2, the other parts of the device remaining stationary when in the position indicated in Fig. 2 of the drawings with the exception of the gears 12, which rotate in their bearings. If now the collar 17 be turned so as to force the hub 5 to the left, friction will be caused on the shafts 13 of the gears 12, thereby retarding their revolution and causing the hub 5 to move, carrying the shaft 2 with it. As the said hub is forced to the left the friction will be gradually increased, driving the hub 5 and shaft 2 with greater rapidity, the rotation of the gears 12 gradually decreasing, and when said gears are carried inward or to the left until the blocks 9 come in contact with the pins 11 the rotation of said gears entirely ceases and the driving part and driven part (the latter comprising the hub 5 and shaft 2) are locked together and revolve in unison.

Having now fully described my invention, what I claim as new therein, and desire to secure by Letters Patent, is—

1. In a device of the character herein specified, a driving part provided with an internal gear, in combination with a driven part provided with a plurality of gears meshing with the internal gear, the shafts of said last-mentioned gears being mounted in friction-bearings, and means for varying the friction of said bearings.

2. In a device of the character herein specified, a driving part provided with a tapering internal gear, in combination with a driven part provided with a plurality of tapering gears meshing with the internal gear, the shafts of said last-mentioned gears being mounted in friction-bearings, and means for varying the friction of said bearings.

3. In a device of the character herein specified, the combination with a driving part provided with an internal gear, of a driven part provided with a plurality of sets of gears meshing with the internal gear, said last-mentioned gears being mounted in friction-bearings arranged to move longitudinally to the driven shaft, and at right angles thereto, and means for moving said bearings.

4. In a device of a character herein specified, the combination with a driven part loosely mounted on the shaft to be driven, and provided with an internal gear, of a shaft to be driven, a longitudinally-movable hub thereon, a plurality of gears carried by friction-bearings pivoted to the hub, and means for moving the hub on the shaft.

5. In a device of the character herein specified, a driving part provided with an internal gear; a shaft to be driven; a longitudinally-movable hub carried by said shaft; spring-controlled bearing-blocks carried by the hub; gears journaled in the bearing-blocks, and means for moving the hub longitudinally on the shaft to be driven, the whole combined, substantially as shown and described.

In testimony whereof I hereto affix my signature in presence of two witnesses.

CHRISTOPHER SCHÖPPNER.

Witnesses:
ALFRED B. BERGER,
JOHN M. NOWACK.